May 22, 1951   V. W. ECKEL   2,553,704
HEAD SPACE GAUGE FOR FIREARMS
Filed July 26, 1947
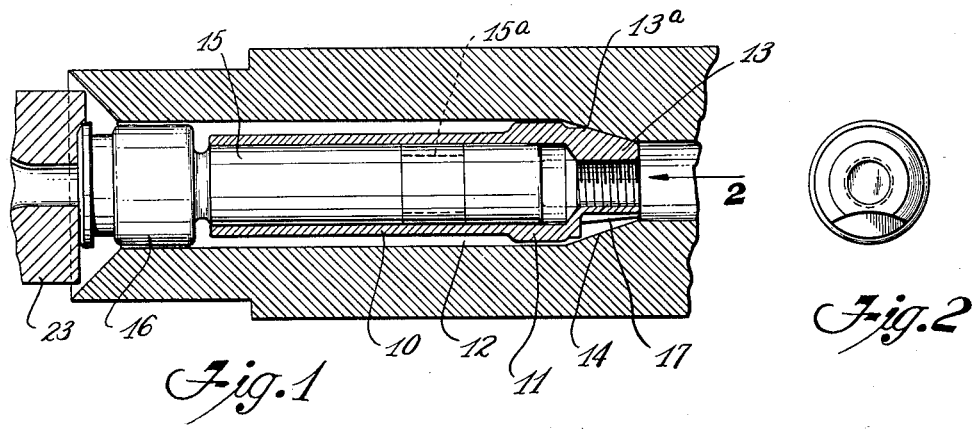
Fig.1   Fig.2
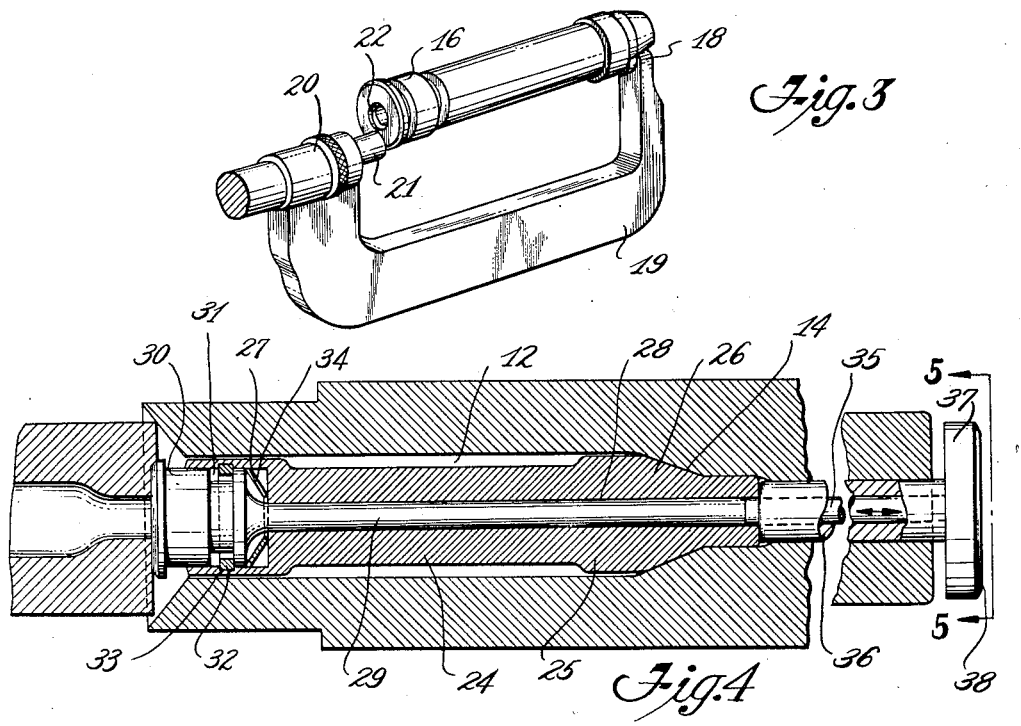
Fig.3
Fig.4
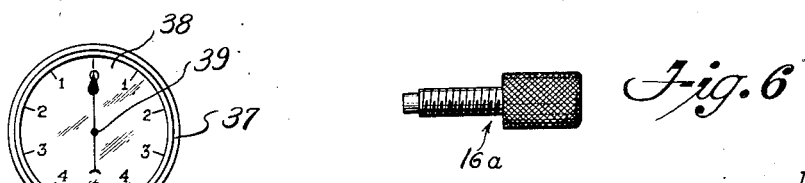
Fig.5   Fig.6
INVENTOR.
VINCENT W. ECKEL
BY Luther S. Hack
Attorney Patented May 22, 1951

2,553,704

UNITED STATES PATENT OFFICE 2,553,704

HEAD SPACE GAUGE FOR FIREARMS

Vincent W. Eckel, South Pasadena, Calif.

Application July 26, 1947, Serial No. 763,881

1 Claim. (Cl. 33—143)

My invention relates to the provision of a gauge for the measurement of the firing chamber in firearms and particularly in rifles. In the manufacture of small arms, especially of rifles, it is of utmost importance that the cartridge cases exactly fit in the firing chamber of the rifle. In order to insure this fit, care has to be taken that the exact head space for the type of cartridge used is provided in the rifle. This is especially true for rifles having a tapered shoulder in the forward part of the firing chamber which has to be engaged by a similar shoulder on the cartridge case. As far as the latter type of rifle is concerned, the head space is represented by the distance from the front end of the breech bolt to the shoulder in the chamber.

In the present art, head space is measured by trial and error, using a series of solid gauges in graduated lengths, and judging which of them has the correct "feel" when the bolt is closed upon it. Thus, accuracy in the use of these gauges is dependent wholly on the experience and skill of the operator.

It is an object of my invention to provide a telescopic gauge consisting of two parts, the relative positions of which indicate the exact head space when introduced in the chamber of the rifle and the bolt is closed.

It is another object of my invention to provide a telescopic gauge which indicates automatically the head space after introduction in the chamber of the rifle and the closing of the bolt.

A further object of my invention is to provide a telescopic head space gauge for firearms which, when positioned in the firing chamber of a rifle and the bolt closed, will automatically be brought to the exact length of the head space and will retain this dimension when removed from the chamber so that the dimension may be accurately read, after which the gauge is extended ready for re-use.

A still further object of the invention is to provide a telescopic head space gauge for rifles and similar arms which, when positioned in the firing chamber and the bolt closed, is brought to the exact length of the head space which may then be read from the gauge either while still in the chamber or after removal therefrom.

Still further objects and features of the invention will hereinafter appear from the following description taken in conjunction with the accompanying drawings in which:

Fig. 1 is a longitudinal section through an embodiment of my invention showing the gauge in place in the chamber of a rifle;

Fig. 2 is an end view of the gauge shown in Fig. 1, looking in the direction of arrow 2;

Fig. 3 is a perspective view showing the reading of the recorded gauge length by means of a conventional micrometer caliper;

Fig. 4 is a longitudinal section through another embodiment of my invention showing the gauge in the chamber of a rifle, and the application of a measuring instrument thereto; and Fig. 5 is an end view of the measuring instrument dial, looking in the direction of arrows 5—5 in Fig. 4; and Fig. 6 is a detail view to a smaller scale of a gauge resetting tool.

The gauge shown in Figs. 1 and 2 comprises a hollow tube or cylinder 10 provided with a drilled and threaded head which is composed of a cylindrical part 11 and a conical end 13. The diameter of the cylindrical part corresponds to the diameter of the firing chamber 12 whereas the slope and length of the conical end corresponds to the slope and length of the tapered shoulder 14 in said chamber 12. A cylindrical plunger 15 which is a tight sliding fit in the cylinder 10 carries a cylindrical head 16 whose outer periphery fits closely against the inner periphery of the chamber 12.

The "gauge point" is the intersection between a certain standard diameter within the cartridge chamber, and the projection of the cone of an established standard angle which is different for each type of cartridge. The gauge point is indicated at 13a in Fig. 1 for the type of cartridge shown in the figure.

The threaded hole through the conical head is adapted to receive a threaded stem 16a which may be used for extending the plunger 15 after taking a reading and in preparation for the next reading to be taken. The conical part 13 is provided with a recess 17 to receive one arm 18 of the conventional micrometer gauge shown in Fig. 3, the inward edge of the recess being a gauge point.

It will be evident that instead of drilling and threading the conical end of the stem and arranging the bolt end of the gauge on a plunger sliding within the tubular forward end of the gauge, I may prefer to form the conical forward end of the gauge on a plunger having a tight sliding fit in a tubular bolt end of the gauge which would be provided with an axially threaded hole through its end for the purpose described.

In order to maintain a desired closeness of fit between the parts of the gauge, I prefer to form a peripheral groove 15a in the plunger 15 and fill this groove with low melting point alloy, which may be done by extending the plunger from the outer member of the gauge until the molten alloy can be ladled into the groove, and then pushing the plunger inwardly to close the groove. As the alloy solidifies, preferably using an alloy that increases slightly in volume in setting, the alloy ring will form a packing assuring a tight sliding fit between the parts of the gauge.

When the inspection gauge is inserted in the chamber 12 of the rifle, as shown in Fig. 1, and the breech bolt 23 is brough to closed position, the plunger 15 whose head contacts the front end of the breech bolt is displaced in the cylinder 10 whose conical end 13 contacts the shoulder 14 of the chamber 12. The distance from the plane of the head 16, engaging the bolt, to the gauge point 13a varies according to the variation of said head space. The distance indicating the head space may be measured by means of the micrometer caliper shown in Fig. 3 in the usual way.

In the embodiment of the invention shown in Figs. 4 and 5 of the drawing, the gauge consists of a cylindrical plug 24 provided at its front end with a head 25. Said head 25 has a conical portion 26 adapted to contact the tapered shoulder 14 of the chamber 12. The rear end of the plug 24 is provided with a hollow cup shaped head 27 whose outer periphery fits closely in the chamber 12. In the plug 24 and head 25 an axial bore 28 is provided adapted to receive a plunger 29 having a cylindrical head 30 slidably fitting in the cup shaped head 27 at the bolt end of the plug. The plunger head 30 is provided with a circular groove 31, and the cup shaped head 27 of the plug is provided at its inside with a groove 33, narrower than groove 31. Both grooves 31 and 33 are engaged by an elastic split ring 32, sprung into groove 33 whereby the gauge members are permanently though telescopically connected. The width of the groove 31 is sufficient to allow the necessary axial displacement of the plunger 29 in the plug 24 in measuring the head space between the end face of the bolt and the gauge point 13a. A relatively strong spring washer 34 is inserted between the head 30 and bottom of the cup shaped head 27 during assembly which tends to hold the plunger 29 in the position shown in Fig. 4, i. e., with the front wall of the groove 31 contacting the split ring 32.

In Figs. 4 and 5 of the drawing, a measuring instrument or inspection gauge is shown by the aid of which the exact head space may be ascertained without the removal of the inspection gauge from the chamber of the rifle. This measuring instrument consists of a rod 35 adapted to pass into the bore 28 of the plug head 25 and mounted in the axial bore of a tubular member 36 whose outer diameter is such as to fit the diameter of the barrel bore of the rifle. The outer end of the tubular member 36 carries a conventional dial indicator 38 which registers axial displacement of the rod 35 in the tubular stem 36.

When the head space gauge is introduced into the chamber of the rifle and the breech bolt is brought to closed position, the plunger 29 is pushed into the bore 28 of the plug 24 against the action of spring 34. The inspection gauge is then introduced into the bore of the barrel until the end of the rod 35 contacts the end of plunger 29, and the tubular member 36 contacts plug head 25. As this position varies according to the relative position of plunger 29, the deviation from the exact length of the head space is indicated on the dial of the inspection gauge, the indicator hand of which is operated by the movement of rod 35 in the usual manner.

Though I have described and shown two preferred embodiments of my invention, many modifications of the construction of the gauge could be made by those skilled in the art without departing from the scope of the invention as defined by the appended claim.

I claim:

A head space gauge for firearms, comprising: a pair of telescopically arranged members, the inner member being slidably and frictionally held in the outer member; a head tapered to fit the forward end of the firing chamber formed on the end of one member; and a head adapted to be engaged by the breech bolt formed on the other member; and a cylindrical portion of one of said members formed adjacent its head closely fitting the firing chamber, and a packing ring positioned in a groove formed in the surface of one member slidably engaging the surface of the other member, the surface of the packing ring engaging against the surface of the other member to ensure a tight sliding fit between the members.

VINCENT W. ECKEL.

REFERENCES CITED

The following references are of record in the file of this patent:

UNITED STATES PATENTS

| Number | Name | Date |
|---|---|---|
| 575,671 | Watts et al. | Jan. 19, 1897 |
| 741,183 | Tasker | Oct. 13, 1903 |
| 1,256,255 | Porter | Feb. 12, 1918 |
| 1,299,627 | Simon | Apr. 8, 1919 |
| 1,351,721 | Eickhoff et al. | Aug. 31, 1920 |
| 2,433,108 | Foster | Dec. 23, 1947 |

FOREIGN PATENTS

| Number | Country | Date |
|---|---|---|
| 13,617 | Great Britain | June 18, 1903 |
| 569,420 | France | Jan. 7, 1924 |